(12) United States Patent
Kawano et al.

(10) Patent No.: US 8,307,668 B2
(45) Date of Patent: Nov. 13, 2012

(54) AIR CONDITIONER

(75) Inventors: Satoshi Kawano, Osaka (JP); Shinya Matsuoka, Osaka (JP)

(73) Assignee: Daikin Industries, Ltd., Osaka (JP)

( * ) Notice: Subject to any disclaimer, the term of this patent is extended or adjusted under 35 U.S.C. 154(b) by 686 days.

(21) Appl. No.: 12/524,030

(22) PCT Filed: Jan. 23, 2008

(86) PCT No.: PCT/JP2008/050903
§ 371 (c)(1),
(2), (4) Date: Jul. 22, 2009

(87) PCT Pub. No.: WO2008/090926
PCT Pub. Date: Jul. 31, 2008

(65) Prior Publication Data
US 2010/0089082 A1    Apr. 15, 2010

(30) Foreign Application Priority Data
Jan. 23, 2007  (JP) .................. 2007-012691

(51) Int. Cl.
*F25B 31/00* (2006.01)
*F25B 49/00* (2006.01)

(52) U.S. Cl. ........................................ 62/193; 62/228.4

(58) Field of Classification Search .............. 62/84, 157, 62/159, 160, 192, 193, 228.1, 228.4, 231
See application file for complete search history.

(56) References Cited

U.S. PATENT DOCUMENTS

| | | | | |
|---|---|---|---|---|
| 5,067,326 A | * | 11/1991 | Alsenz | 62/193 |
| 5,323,619 A | * | 6/1994 | Kim | 62/160 |
| 7,854,137 B2 | * | 12/2010 | Lifson et al. | 62/193 |
| 2006/0153723 A1 | | 7/2006 | Kurita et al. | |

FOREIGN PATENT DOCUMENTS

| | | |
|---|---|---|
| JP | 4-73559 A | 3/1992 |
| JP | 6-265232 A | 9/1994 |
| JP | 9-264628 A | 10/1997 |
| JP | 2002-257427 A | 9/2002 |
| JP | 2003-106690 A | 4/2003 |
| JP | 2005-2832 A | 1/2005 |
| JP | 2006-177619 A | 7/2006 |

* cited by examiner

*Primary Examiner* — Marc Norman
(74) *Attorney, Agent, or Firm* — Birch, Stewart, Kolasch & Birch, LLP.

(57) ABSTRACT

When during a heating operation the value calculated by an oil amount calculation section (51) is equal to or above a predetermined value, a frequency control section (52) of a controller (50) increases the operating frequency of a compressor (21) in order to recover refrigerating machine oil in a refrigerant circuit (R).

7 Claims, 8 Drawing Sheets

AIR CONDITIONER

TECHNICAL FIELD

This invention relates to air conditioners and particularly relates to a technique for recovering to a compressor refrigerating machine oil accumulating in a refrigerant circuit.

BACKGROUND ART

Refrigeration systems are conventionally known which operate in a refrigeration cycle by circulating refrigerant through a refrigerant circuit, and are widely used for various applications, such as air conditioners. For example, Patent Document 1 discloses a configuration using a so-called hermetically sealed compressor. In the hermetically sealed compressor, a compression mechanism and a motor are contained in a single casing. Furthermore, in the hermetically sealed compressor, an oil feeding channel is formed in the drive shaft of the compression mechanism so that refrigerating machine oil accumulating in the bottom of the casing is fed through the oil feeding channel to the compression mechanism.

Patent Document 1: Published Japanese Patent Application No. 2005-002832

DISCLOSURE OF THE INVENTION

Problems to be Solved by the Invention

In the above air conditioner, during operation of the compressor, the refrigerating machine oil may be discharged together with high-pressure refrigerant and accumulate in the refrigerant circuit. If this condition is left unchecked, the amount of refrigerating machine oil in the casing of the compressor will be small, and in turn there may arise troubles, such as burnout of the compressor due to poor lubrication.

To solve the above problem, it is conceivable to operate the air conditioner in a cooling cycle to circulate wet refrigerant through the refrigerant circuit, thereby blending refrigerating machine oil accumulating in the refrigerant circuit into liquid refrigerant and then recovering it to the compressor.

However, in this method, for example when the air conditioner is in a heating operation, it must be temporarily switched to a cooling cycle only for the recovery of refrigerating machine oil and then returned back to a heating cycle after the recovery. This presents a problem in that the heating capacity of the air conditioner is significantly impaired.

The present invention has been made in view of the foregoing points and, therefore, an object thereof is to recover refrigerating machine oil accumulating in the refrigerant circuit without impairing the heating capacity of the air conditioner.

Means to Solve the Problems

A first aspect of the invention is an air conditioner including a refrigerant circuit (R) in which a compressor (21), a heat-source side heat exchanger (22) and a utilization side heat exchanger (41) are connected, the refrigerant circuit (R) being operable in a refrigeration cycle by circulating refrigerant therethrough, the air conditioner including:
 oil amount calculation means (51) configured to calculate the amount of refrigerating machine oil discharged together with high-pressure refrigerant from the compressor (21) and accumulating in the refrigerant circuit (R); and
 frequency control means (52) configured to increase the operating frequency of the compressor (21) to recover the refrigerating machine oil in the refrigerant circuit (R) when during a heating operation the value calculated by the oil amount calculation means (51) is equal to or above a predetermined value.

In the first aspect of the invention, the oil amount calculation means (51) calculates the amount of refrigerating machine oil discharged together with high-pressure refrigerant from the compressor (21) and accumulating in the refrigerant circuit (R). When during a heating operation the value calculated by the oil amount calculation means (51) is equal to or above a predetermined value, the frequency control means (52) increases the operating frequency of the compressor (21) to recover the refrigerating machine oil in the refrigerant circuit (R).

In this manner, when the amount of refrigerating machine oil accumulating in the refrigerant circuit (R) is equal to or above the predetermined value, i.e., when the refrigerant circuit (R) has been placed into a state in which the refrigerating machine oil must be recovered because of high probability of the occurrence of poor lubrication in the compressor (21), the compressor (21) is controlled to increase the operating frequency so that the refrigerating machine oil accumulating in a pipe of the refrigerant circuit (R) can be forcedly circulated through the refrigerant circuit (R) and recovered to the compressor (21). This is preferable because the refrigerating machine oil accumulating in the refrigerant circuit (R) can be recovered without the need to switch to a cooling cycle during the heating operation and, therefore, because the heating capacity can be prevented from being reduced.

A second aspect of the invention is the air conditioner according to the first aspect of the invention, further including
 pressure detection means (Ps1) configured to detect the high-side pressure of refrigerant flowing through the refrigerant circuit (R),
 wherein the utilization side heat exchanger (41) is connected at one end to a liquid pipe (13) in the refrigerant circuit (R), and connected at the other end through a switching mechanism (30A) to a high-pressure gas pipe (11) and a low-pressure gas pipe (12) in the refrigerant circuit (R) to be switchable between both the gas pipes, and
 the switching mechanism (30A) includes a first control valve (31) for selectively permitting or shutting off the flow of refrigerant into the high-pressure gas pipe (11), and a second control valve (32) for selectively permitting or shutting off the flow of refrigerant into the low-pressure gas pipe (12), and is configured to provide communication between the high-pressure gas pipe (11) and the low-pressure gas pipe (12) by opening the second control valve (32) when the value detected by the pressure detection means (Ps1) is equal to or above a predetermined value after the frequency control means (52) increases the operating frequency of the compressor (21) during the heating operation.

In the second aspect of the invention, when the value detected by the pressure detection means (Ps1) configured to detect the high-side pressure of refrigerant flowing through the refrigerant circuit (R) is equal to or above a predetermined value after the frequency control means (52) increases the operating frequency of the compressor (21) during the heating operation, the second control valve (32) of the switching mechanism (30A) is opened to provide communication between the high-pressure gas pipe (11) and the low-pressure gas pipe (12).

Therefore, if the high-side pressure of refrigerant in the refrigerant circuit (R) becomes too high by forcedly circulating refrigerating machine oil accumulating in the refrigerant circuit (R) through the control over the capacity of the compressor (21), the switching mechanism (30A) can provide communication between the high-pressure gas pipe (11) and the low-pressure gas pipe (12) and thereby lead high-pressure gas refrigerant to the compressor (21). This provides an advantageous effect in reducing the increase of pressure in the refrigerant circuit (R) to prevent the entire system from being stopped.

A third aspect of the invention is the air conditioner according to the second aspect of the invention, further including:

a supercooling heat exchanger (61) for supercooling liquid refrigerant flowing through the liquid pipe (13);

a supercooling pipe (62) connected at one end to the liquid pipe (13), passing through the supercooling heat exchanger (61) and connected at the other end to the low-pressure gas pipe (12);

a supercooling control valve (63) disposed in the supercooling pipe (62) between the one end of the supercooling pipe (62) and the supercooling heat exchanger (61) and being adjustable in opening; and opening control means (53) configured to control the opening of the supercooling control valve (63) to allow liquid refrigerant to flow into the low-pressure gas pipe (12) when the value calculated by the oil amount calculation means (51) is equal to or above the predetermined value.

In the third aspect of the invention, the oil amount calculation means (51) calculates the amount of refrigerating machine oil discharged together with high-pressure refrigerant from the compressor (21) and accumulating in the refrigerant circuit (R). When the value calculated by the oil amount calculation means (51) is equal to or above the predetermined value, the opening control means (53) controls the opening of the supercooling control valve (63) to allow liquid refrigerant to flow into the low-pressure gas pipe (12).

Therefore, even if refrigerating machine oil accumulates in the low-pressure gas pipe (12), the refrigerating machine oil accumulating in the low-pressure gas pipe (12) can be blended into liquid refrigerant to recover it to the compressor (21) by controlling the opening of the supercooling control valve (63) to allow the liquid refrigerant to flow through the supercooling pipe (62) into the low-pressure gas pipe (12). This is preferable because the refrigerating machine oil accumulating in the low-pressure gas pipe (12) can be recovered without the need to switch to a cooling cycle during the heating operation and, therefore, because the heating capacity can be prevented from being reduced.

A fourth aspect of the invention is the air conditioner according to any one of the first to third aspects of the invention, wherein the oil amount calculation means (51) is configured to calculate the amount of refrigerating machine oil accumulating in the refrigerant circuit (R) based on the amount of high-pressure refrigerant discharged from the compressor (21) when the flow velocity of refrigerant in the refrigerant circuit (R) is below a predetermined flow velocity.

In the fourth aspect of the invention, the oil amount calculation means (51) calculates the amount of refrigerating machine oil accumulating in the refrigerant circuit (R) based on the amount of high-pressure refrigerant discharged from the compressor (21) when the flow velocity of refrigerant in the refrigerant circuit (R) is below a predetermined flow velocity.

Therefore, the amount of refrigerating machine oil accumulating in the refrigerant circuit (R) can be easily calculated based on the flow velocity of refrigerant in the refrigerant circuit (R) and the amount of high-pressure refrigerant discharged from the compressor (21). Hence, whether the compressor (21) is likely to cause a poor lubrication can be easily determined based on the calculated amount of refrigerating machine oil. The value calculated by the oil amount calculation means (51) can be utilized for the control over the capacity of the compressor (21).

A fifth aspect of the invention is an air conditioner including a refrigerant circuit (R) in which a compressor (21), a heat-source side heat exchanger (22) and a utilization side heat exchanger (41) are connected, the refrigerant circuit (R) being operable in a refrigeration cycle by circulating refrigerant therethrough, the air conditioner including frequency control means (52) configured to integrate the operating period of time of the compressor (21) during which the air conditioner is in a heating operation and the compressor (21) is operating at a predetermined frequency or below, and increase the operating frequency of the compressor (21) when the integrated value of the operating period of time is equal to or above a predetermined value.

In the fifth aspect of the invention, when during a heating operation the integrated value of the operating period of time during which the compressor (21) is operating at the predetermined frequency or below is equal to or above a predetermined value, the frequency control means (52) increases the operating frequency of the compressor (21).

In this manner, when the integrated value of the operating period of time during which the compressor (21) is operating at the predetermined frequency or below is equal to or above the predetermined value, i.e., when the refrigerant circuit (R) has been placed into a state in which the refrigerating machine oil must be recovered because of high probability of the occurrence of poor lubrication in the compressor (21), the compressor (21) is controlled to increase the operating frequency so that the refrigerating machine oil accumulating in a pipe of the refrigerant circuit (R) can be forcedly circulated through the refrigerant circuit (R) and recovered to the compressor (21). This is preferable because the refrigerating machine oil accumulating in the refrigerant circuit (R) can be recovered without the need to switch to a cooling cycle during the heating operation and, therefore, because the heating capacity can be prevented from being reduced.

A sixth aspect of the invention is the air conditioner according to the fifth aspect of the invention, wherein the frequency control means (52) is configured to return the increased operating frequency of the compressor (21) to an operating frequency in a normal operation when a predetermined period of time has passed since the increase of the operating frequency.

In the sixth aspect of the invention, when a predetermined period of time has passed since the operating frequency of the compressor (21) was increased by the frequency control means (52), the frequency control means (52) returns the operating frequency to an operating frequency in a normal operation.

Therefore, the compressor (21) is returned to an operating frequency in a normal operation after a required predetermined period of time to complete the recovery of refrigerating machine oil accumulating in the refrigerant circuit (R) has passed. Thus, the load on the compressor (21) can be reduced to a necessary minimum.

A seventh aspect of the invention is the air conditioner according to the fifth or sixth aspect of the invention, further including pressure detection means (Ps1) configured to detect the high-side pressure of refrigerant flowing through the refrigerant circuit (R), wherein the utilization side heat exchanger (41) is connected at one end to a liquid pipe (13) in the refrigerant circuit (R), and connected at the other end through a switching mechanism (30A) to a high-pressure gas pipe (11) and a low-pressure gas pipe (12) in the refrigerant circuit (R) to be switchable between both the gas pipes, and the switching mechanism (30A) includes a first control valve (31) for selectively permitting or shutting off the flow of refrigerant into the high-pressure gas pipe (11), and a second control valve (32) for selectively permitting or shutting off the flow of refrigerant into the low-pressure gas pipe (12), and is configured to provide communication between the high-pressure gas pipe (11) and the low-pressure gas pipe (12) by opening the second control valve (32) when the value detected by the pressure detection means (Ps1) is equal to or above a predetermined value after the frequency control means (52) increases the operating frequency of the compressor (21) during the heating operation.

In the seventh aspect of the invention, when the value detected by the pressure detection means (Ps1) configured to detect the high-side pressure of refrigerant flowing through the refrigerant circuit (R) is equal to or above a predetermined value after the frequency control means (52) increases the operating frequency of the compressor (21) during the heating operation, the second control valve (32) of the switching mechanism (30A) is opened to provide communication between the high-pressure gas pipe (11) and the low-pressure gas pipe (12).

Therefore, if the high-side pressure of refrigerant in the refrigerant circuit (R) becomes too high by forcedly circulating refrigerating machine oil accumulating in the refrigerant circuit (R) through the control over the capacity of the compressor (21), the switching mechanism (30A) can provide communication between the high-pressure gas pipe (11) and the low-pressure gas pipe (12) and thereby lead high-pressure gas refrigerant to the compressor (21). This provides an advantageous effect in reducing the increase of pressure in the refrigerant circuit (R) to prevent the entire system from being stopped.

An eighth aspect of the invention is the air conditioner according to the seventh aspect of the invention, further including:

a supercooling heat exchanger (61) for supercooling liquid refrigerant flowing through the liquid pipe (13);

a supercooling pipe (62) connected at one end to the liquid pipe (13), passing through the supercooling heat exchanger (61) and connected at the other end to the low-pressure gas pipe (12);

a supercooling control valve (63) disposed in the supercooling pipe (62) between the one end of the supercooling pipe (62) and the supercooling heat exchanger (61) and being adjustable in opening; and opening control means (53) configured to control the opening of the supercooling control valve (63) to allow liquid refrigerant to flow into the low-pressure gas pipe (12) when the integrated value of the operating period of time of the compressor (21) during which the compressor (21) is operating at the predetermined frequency or below is equal to or above the predetermined value.

In the eighth aspect of the invention, when the integrated value of the operating period of time during which the compressor (21) is operating at the predetermined frequency or below is equal to or above the predetermined value, the opening control means (53) controls the opening of the supercooling control valve (63) to allow liquid refrigerant to flow into the low-pressure gas pipe (12).

Therefore, even if refrigerating machine oil accumulates in the low-pressure gas pipe (12), the refrigerating machine oil accumulating in the low-pressure gas pipe (12) can be blended into liquid refrigerant to recover it to the compressor (21) by controlling the opening of the supercooling control valve (63) to allow the liquid refrigerant to flow through the supercooling pipe (62) into the low-pressure gas pipe (12). This is preferable because the refrigerating machine oil accumulating in the low-pressure gas pipe (12) can be recovered without the need to switch to a cooling cycle during the heating operation and, therefore, because the heating capacity can be prevented from being reduced.

Effects Of The Invention

According to the present invention, when the amount of refrigerating machine oil accumulating in the refrigerant circuit (R) is equal to or above the predetermined value, i.e., when the refrigerant circuit (R) has been placed into a state in which the refrigerating machine oil must be recovered because of high probability of the occurrence of poor lubrication in the compressor (21), the compressor (21) is controlled to increase the operating frequency so that the refrigerating machine oil accumulating in a pipe of the refrigerant circuit (R) can be forcedly circulated through the refrigerant circuit (R) and recovered to the compressor (21). This is preferable because the refrigerating machine oil accumulating in the refrigerant circuit (R) can be recovered without the need to switch to a cooling cycle during the heating operation and, therefore, because the heating capacity can be prevented from being reduced.

According to the second aspect of the invention, if the high-side pressure of refrigerant in the refrigerant circuit (R) becomes too high by forcedly circulating refrigerating machine oil accumulating in the refrigerant circuit (R) through the control over the capacity of the compressor (21), the switching mechanism (30A) can provide communication between the high-pressure gas pipe (11) and the low-pressure gas pipe (12) and thereby lead high-pressure gas refrigerant to the compressor (21). This provides an advantageous effect in reducing the increase of pressure in the refrigerant circuit (R) to prevent the entire system from being stopped.

According to the third aspect of the invention, even if refrigerating machine oil accumulates in the low-pressure gas pipe (12), the refrigerating machine oil accumulating in the low-pressure gas pipe (12) can be blended into liquid refrigerant to recover it to the compressor (21) by controlling the opening of the supercooling control valve (63) to allow the liquid refrigerant to flow through the supercooling pipe (62) into the low-pressure gas pipe (12). This is preferable because the refrigerating machine oil accumulating in the low-pressure gas pipe (12) can be recovered without the need to switch to a cooling cycle during the heating operation and, therefore, because the heating capacity can be prevented from being reduced.

According to the fourth aspect of the invention, the amount of refrigerating machine oil accumulating in the refrigerant circuit (R) can be easily calculated based on the flow velocity of refrigerant in the refrigerant circuit (R) and the amount of high-pressure refrigerant discharged from the compressor (21). Hence, whether the compressor (21) is likely to cause a poor lubrication can be easily determined based on the calculated amount of refrigerating machine oil. The value calculated by the oil amount calculation means (51) can be utilized for the control over the capacity of the compressor (21).

According to the fifth aspect of the invention, when the integrated value of the operating period of time during which the compressor (21) is operating at the predetermined frequency or below is equal to or above the predetermined value, i.e., when the refrigerant circuit (R) has been placed into a state in which the refrigerating machine oil must be recovered because of high probability of the occurrence of poor lubrication in the compressor (21), the compressor (21) is controlled to increase the operating frequency so that the refrigerating machine oil accumulating in a pipe of the refrigerant circuit (R) can be forcedly circulated through the refrigerant circuit (R) and recovered to the compressor (21). This is preferable because the refrigerating machine oil accumulating in the refrigerant circuit (R) can be recovered without the need to switch to a cooling cycle during the heating operation and, therefore, because the heating capacity can be prevented from being reduced.

According to the sixth aspect of the invention, the compressor (21) is returned to an operating frequency in a normal operation after a required predetermined period of time to complete the recovery of refrigerating machine oil accumulating in the refrigerant circuit (R) has passed. Thus, the load on the compressor (21) can be reduced to a necessary minimum.

According to the seventh aspect of the invention, if the high-side pressure of refrigerant in the refrigerant circuit (R) becomes too high by forcedly circulating refrigerating machine oil accumulating in the refrigerant circuit (R) through the control over the capacity of the compressor (21), the switching mechanism (30A) can provide communication between the high-pressure gas pipe (11) and the low-pressure gas pipe (12) and thereby lead high-pressure gas refrigerant to the compressor (21). This provides an advantageous effect in reducing the increase of pressure in the refrigerant circuit (R) to prevent the entire system from being stopped.

According to the eighth aspect of the invention, even if refrigerating machine oil accumulates in the low-pressure gas pipe (12), the refrigerating machine oil accumulating in the low-pressure gas pipe (12) can be blended into liquid refrigerant to recover it to the compressor (21) by controlling the opening of the supercooling control valve (63) to allow the liquid refrigerant to flow through the supercooling pipe (62) into the low-pressure gas pipe (12). This is preferable because the refrigerating machine oil accumulating in the low-pressure gas pipe (12) can be recovered without the need to switch to a cooling cycle during the heating operation and, therefore, because the heating capacity can be prevented from being reduced.

Figure 1:
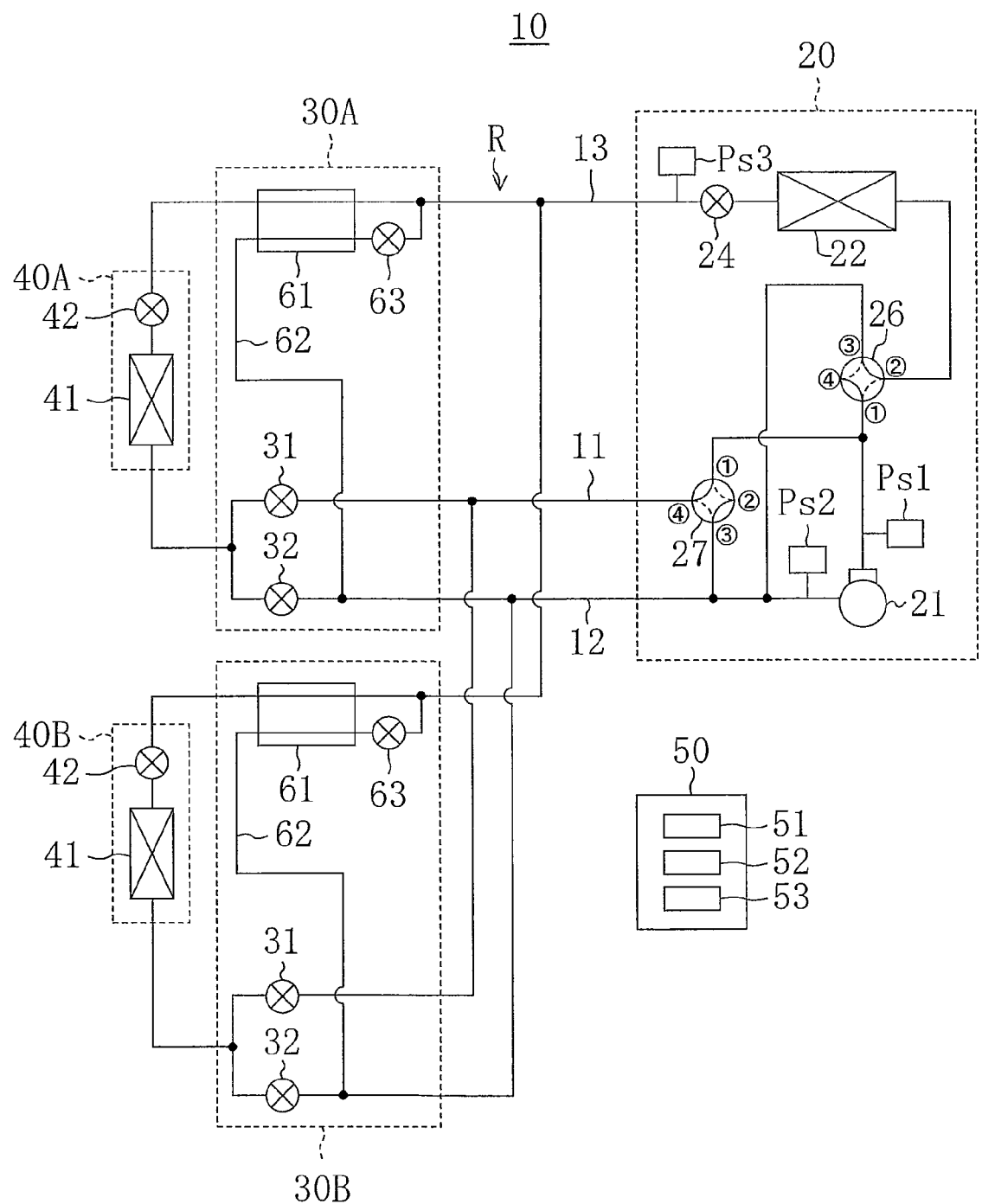
FIG. 1 is a refrigerant circuit diagram showing the configuration of an air conditioner according to an embodiment of the present invention.

LIST OF REFERENCE CHARACTERS 10 air conditioner
11 high-pressure gas pipe
12 low-pressure gas pipe
13 liquid pipe
21 compressor
22 outdoor heat exchanger (heat-source side heat exchanger)
30A, 30B BS unit (switching mechanism)
31 first control valve
32 second control valve
41 indoor heat exchanger (utilization side heat exchanger)
50 controller
51 oil amount calculation section
52 frequency control section
53 opening control section
61 supercooling heat exchanger
62 supercooling pipe
63 supercooling control valve
Ps1 high-side pressure sensor (pressure detection means)

BEST MODE FOR CARRYING OUT THE INVENTION

Embodiments of the present invention will be described below with reference to the drawings. The following description of preferred embodiments is merely illustrative in nature and is not intended to limit the scope, applications and use of the invention.

<General Configuration>

FIG. 1 is a refrigerant circuit diagram showing the general configuration of an air conditioner according to an embodiment of the present invention. As shown in FIG. 1, in the air conditioner according to the present invention, two first and second indoor units (40A, 40B) connected in parallel to each other are connected to a single outdoor unit (20) through first and second BS units (30A, 30B) by high-pressure gas pipes (11), low-pressure gas pipes (12) and liquid pipes (13), thereby constituting a refrigerant circuit (R). The refrigerant circuit (R) is operated in a vapor compression refrigeration cycle by circulating refrigerant therethrough, and can selectively perform a cooling operation or a heating operation.

<Structure of Outdoor Unit>

The outdoor unit (20) constitutes a heat-source side unit, and includes a compressor (21), an outdoor heat exchanger (22), an outdoor expansion valve (24), a first four-way selector valve (26), and a second four-way selector valve (27). The compressor (21) is constituted by an inverter-driven compressor variable in capacity. The outdoor heat exchanger (22) is a cross-fin-and-tube heat exchanger, and constitutes a heat-source side heat exchanger in the present invention. The outdoor expansion valve (24) is an electronic expansion valve, and constitutes a heat-source side expansion valve in the present invention.

The outdoor unit (20) is provided with a plurality of pressure sensors (Ps1, Ps2, Ps3) for detecting the pressure of refrigerant. More specifically, the discharge side of the compressor (21) is provided with a high-side pressure sensor (Ps1) for detecting the pressure of high-pressure refrigerant, and the suction side of the compressor (21) is provided with a low-side pressure sensor (Ps2) for detecting the pressure of low-pressure refrigerant. In the liquid pipe (13) between the outdoor expansion valve (24) and both of the first and second indoor units (40A, 40B) is provided a liquid-side pressure sensor (Ps3) for detecting the pressure of refrigerant flowing through the liquid pipe (13).

Each of the first four-way selector valve (26) and the second four-way selector valve (27) has first to fourth ports. In the first four-way selector valve (26), the first port is connected to the discharge side of the compressor (21), the second port is connected to the outdoor heat exchanger (22), and the third port is connected to the suction side of the compressor (21). The fourth port of the first four-way selector valve (26) is closed.

In the second four-way selector valve (27), the first port is connected to the discharge side of the compressor (21), the second port is closed, the third port is connected to the suction side of the compressor (21), and the fourth port is connected to the first and second indoor units (40A, 40B).

Each of the first four-way selector valve (26) and the second four-way selector valve (27) is switchable between a first position in which the first and fourth ports are communicated with each other and the second and third ports are communicated with each other (the position shown in the solid lines in FIG. 1), and a second position in which the first and second ports are communicated with each other and the third and fourth ports are communicated with each other (the position shown in the broken lines in FIG. 1). Instead of the four-way selector valves (26, 27), three-way selector valves may be used to constitute a first selector valve (26) and a second selector valve (27). Alternatively, two solenoid valves may be used to constitute each of the first selector valve (26) and the second selector valve (27).

<Structure of Indoor Unit>

The first and second indoor units (40A, 40B) constitute utilization side units in the present invention, and each include an indoor heat exchanger (41) and an indoor expansion valve (42). The indoor heat exchanger (41) is a cross-fin-and-tube heat exchanger, and constitutes a utilization side heat exchanger in the present invention. The indoor expansion valve (42) is an electronic expansion valve, and constitutes a utilization side expansion valve in the present invention. The indoor heat exchanger (41) and the indoor expansion valve (42) are disposed in that order from the gas-side end of each of the first and second indoor units (40A, 40B).

The gas-side end of each of the first and second indoor units (40A, 40B) is connected through the associated first or second BS unit (30A, 30B) to the high-pressure gas pipe (11) and the low-pressure gas pipe (12) to be switchable between both the gas pipes. The high-pressure gas pipe (11) is connected to the fourth port of the second four-way selector valve (27) in the outdoor unit (20). The low-pressure gas pipe (12) is connected to the suction side of the compressor (21). The liquid-side end of each of the first and second indoor units (40A, 40B) is connected through the liquid pipe (13) to the outdoor heat exchanger (22) in the outdoor unit (20).

<Structure of BS Unit>

In the air conditioner (10), the first and second BS units (30A, 30B) are provided in association with the first and second indoor units (40A, 40B), respectively. Each BS unit (30A, 30B) constitutes a switching mechanism. Thus, a "cool/heat mode selectable" air conditioner (10) is constituted in which the user can select a cooling operation or a heating operation in each indoor unit (40A, 40B).

Each BS unit (30A, 30B) has a high-pressure gas pipe (11) and a low-pressure gas pipe (12) both of which branch from the associated indoor unit (40A, 40B). The high-pressure gas pipe (11) is provided with a first control valve (31) adjustable in opening, whereas the low-pressure gas pipe (12) is provided with a second control valve (32) adjustable in opening.

Each BS unit (30A, 30B) can switch the refrigerant flow paths to communicate the gas-side end of the associated indoor unit (40A, 40B) with one of the suction and discharge sides of the compressor (21) by controlling the openings of the first control valve (31) and the second control valves (32).

Each of the first and second BS units (30A, 30B) includes a supercooling heat exchanger (61) and a supercooling pipe (62) both of which constitute a supercooling circuit. The supercooling heat exchanger (61) is used in order to supercool liquid refrigerant flowing through the liquid pipe (13). The supercooling pipe (62) is connected at one end to the liquid pipe (13), passes through the supercooling heat exchanger (61), and is then connected at the other end to the low-pressure gas pipe (12).

Furthermore, a supercooling control valve (63) adjustable in opening is disposed in the supercooling pipe (62) between the one end of the supercooling pipe (62) and the supercooling heat exchanger (61). By adjusting the opening of the supercooling control valve (63), the amount of liquid refrigerant flowing into the supercooling circuit is controlled. As will be more fully described hereinafter, the opening of the supercooling control valve (63) is controlled by a controller (50) based on the amount of refrigerating machine oil accumulating in the refrigerant circuit (R).

The liquid refrigerant flowing through the supercooling pipe (62) is reduced in pressure by the supercooling control valve (63), exchanges heat with the liquid refrigerant flowing though the liquid pipe (13) in the supercooling heat exchanger (61) to evaporate, and is then recovered through the low-pressure gas pipe (12).

Although in FIG. 1 only two first and second indoor units (40A, 40B) are shown, the number of indoor units is not limited to this number.

<Structure of Controller>

The air conditioner (10) includes a controller (50). The controller (50) includes an oil amount calculation section (51), a frequency control section (52), and an opening control section (53).

The oil amount calculation section (51) calculates the amount of refrigerating machine oil discharged together with high-pressure refrigerant from the compressor (21) and accumulating in the refrigerant circuit (R). More specifically, the oil amount calculation section (51) is configured to calculate the amount of refrigerating machine oil accumulating in the refrigerant circuit (R) based on the amount of high-pressure refrigerant discharged from the compressor (21) when the flow velocity of refrigerant in the refrigerant circuit (R) is below a predetermined flow velocity.

It can be believed that when the flow velocity of refrigerant is equal to or above a predetermined flow velocity, the refrigerating machine oil smoothly circulates through the refrigerant circuit (R) and is recovered to the compressor (21), but that when the flow velocity of refrigerant is low, the refrigerant does not have a force large enough to wash away the refrigerating machine oil in the refrigerant circuit (R) whereby the refrigerating machine oil accumulates in the refrigerant circuit (R). This shows that if, based on whether or not the refrigerant has a flow velocity high enough to wash away refrigerating machine oil, the amount of high-pressure refrigerant discharged from the compressor (21) when the refrigerant is circulating at flow velocities below the predetermined flow velocity is previously detected, the amount of refrigerating machine oil accumulating in the refrigerant circuit (R) can be calculated.

The frequency control section (52) controls the capacity of the compressor (21), and particularly controls the operating frequency of the compressor (21) to increase it so that the flow velocity of refrigerant in the refrigerant circuit (R) reaches the predetermined flow velocity. More specifically, the frequency control section (52) integrates the operating period of time of the compressor (21) during which the compressor (21) is operating at a predetermined frequency or below, and increases the operating frequency of the compressor (21) when the integrated value of the operating period of time is equal to or above a predetermined value.

Furthermore, the frequency control section (52) controls the operating frequency of the compressor (21) to return the increased operating frequency to an operating frequency in a normal operation when a predetermined period of time has passed since the increase of the operating frequency. Thus, the load on the compressor (21) can be reduced to a necessary minimum.

The opening control section (53) controls the openings of the first and second four-way selector valves (26, 27), the indoor expansion valve (42), the outdoor expansion valve (24), the first and second control valves (31, 32) and the supercooling control valve (63).

-OPERATIONS-

Next will be described the operations of the air conditioner (10) according to this embodiment. The air conditioner (10) can perform a plurality of types of operations according to the settings of the first and second four-way selector valves (26, 27) and the open and closed positions of the first control valve (31) and the second control valve (32) in each BS unit (30A, 30B). Among them, a few representative operations will be described below by way of example.

<Full Heating Operation>

Figure 2:
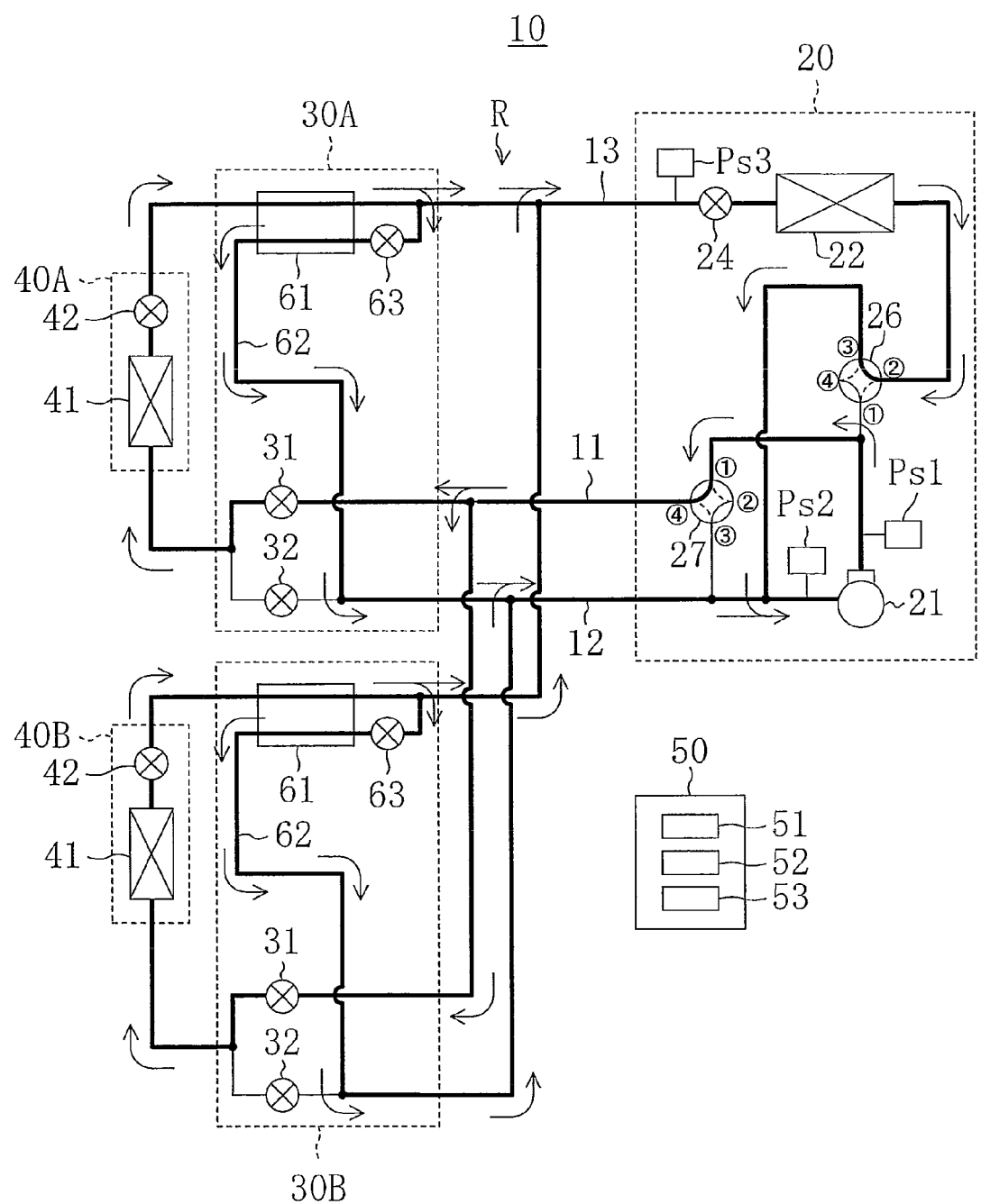
FIG. 2 is a refrigerant circuit diagram for illustrating the flow of refrigerant in a full heating operation.

The full heating operation is an operation in which all the indoor units (40A, 40B) heat their respective rooms. As shown in FIG. 2, in this operation, each of the first and second four-way selector valves (26, 27) is set to a position in which the first and fourth ports are communicated with each other and the second and third ports are communicated with each other. In each BS unit (30A, 30B), the first control valve (31) is opened, and the second control valve (32) is closed.

In this operation, the air conditioner (10) operates in a refrigeration cycle in which the outdoor heat exchanger (22) serves as an evaporator and the indoor heat exchangers (41, 41) serve as condensers. In the refrigeration cycle, the refrigerant discharged from the compressor (21) passes through the second four-way selector valve (27), and is then diverted into the high-pressure gas pipes (11) of the BS units (30A, 30B).

The refrigerant having passed through each BS unit (30A, 30B) flows into the associated indoor unit (40A, 40B). For example, in the first indoor unit (40A), when flowing through the indoor heat exchanger (41), the refrigerant releases heat to room air in the indoor heat exchanger (41) to condense. As a result, the room associated with the first indoor unit (40A) is heated. The refrigerant having condensed in the indoor heat exchanger (41) passes through the indoor expansion valve (42). In the second indoor unit (40B), the refrigerant flows like the first indoor unit (40A), whereby the associated room is heated.

The refrigerant having flowed out of each indoor unit (40A, 40B) flows through the liquid pipe (13). In each of the first and second BS units (30A, 30B), part of the refrigerant flowing through the liquid pipe (13) flows into the supercooling pipe (62), and the rest passes through the supercooling heat exchanger (61) and then flows into the outdoor unit (20).

In the course of the above flow of refrigerant, the liquid refrigerant having flowed into the supercooling pipe (62) is reduced in pressure by the supercooling control valve (63), and then passes through the supercooling heat exchanger (61). In the supercooling heat exchanger (61), the liquid refrigerant flowing through the supercooling pipe (62) exchanges heat with the liquid refrigerant flowing through the liquid pipe (13) to evaporate. The refrigerant having evaporated flows into the low-pressure gas pipe (12) and then returns to the compressor (21).

The refrigerant having flowed into the outdoor unit (20) is reduced to a low pressure during passage through the outdoor expansion valve (24), and then flows through the outdoor heat exchanger (22). In the outdoor heat exchanger (22), the refrigerant takes heat from outdoor air to evaporate. The refrigerant having evaporated in the outdoor heat exchanger (22) passes through the first four-way selector valve (26), and is then sucked into and compressed again by the compressor (21).

<Full Cooling Operation>

Figure 3:
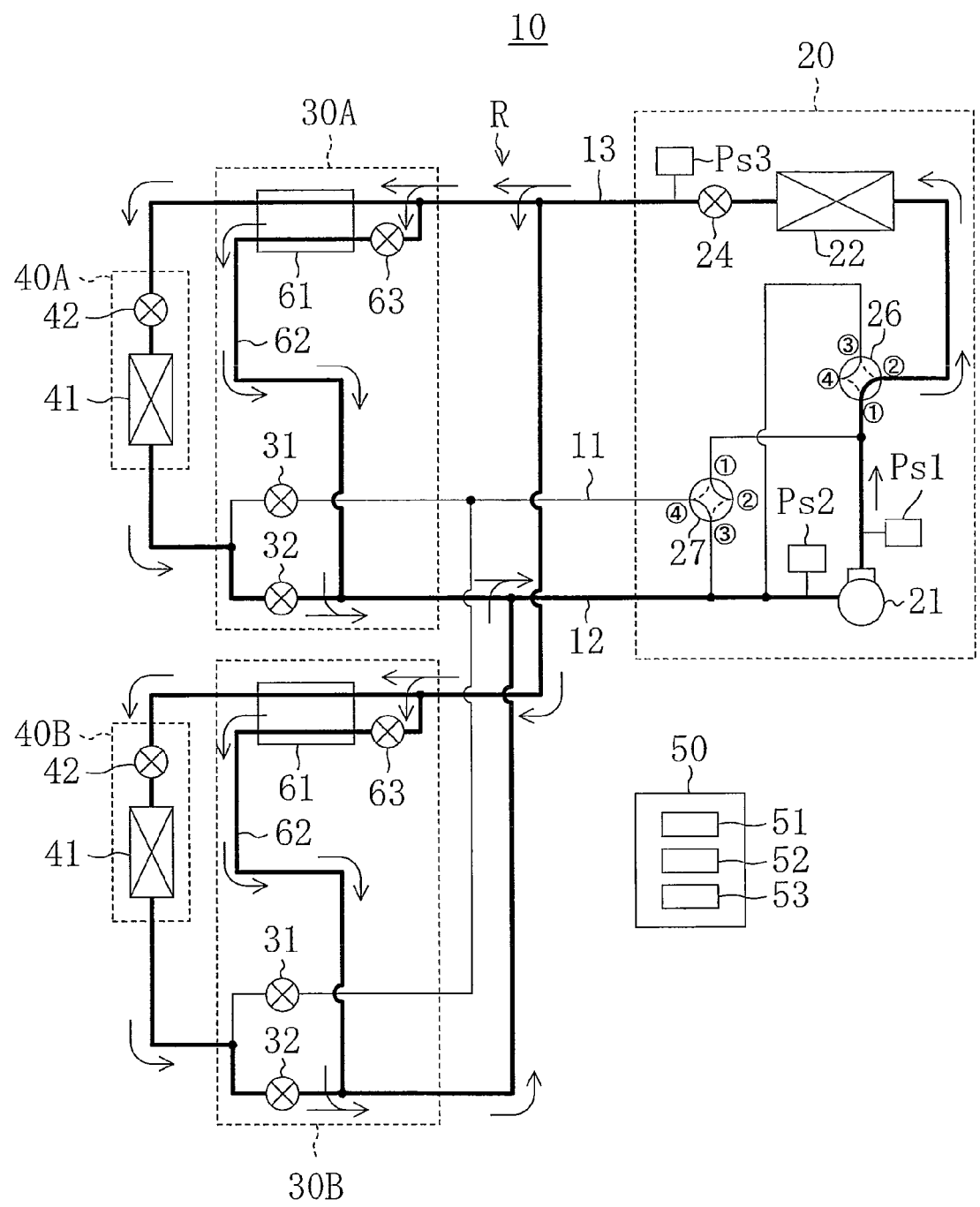
FIG. 3 is a refrigerant circuit diagram for illustrating the flow of refrigerant in a full cooling operation.

The full cooling operation is an operation in which all the indoor units (40A, 40B) cool their respective rooms. As shown in FIG. 3, in this operation, each of the first and second four-way selector valves (26, 27) is set to a position in which the first and second ports are communicated with each other and the third and fourth ports are communicated with each other. In each BS unit (30A, 30B), the second control valve (32) is opened, and the first control valve (31) is closed.

In this operation, the air conditioner (10) operates in a refrigeration cycle in which the outdoor heat exchanger (22) serves as a condenser and the indoor heat exchangers (41, 41) serve as evaporators. More specifically, the refrigerant discharged from the compressor (21) passes through the first four-way selector valve (26), and then flows through the outdoor heat exchanger (22). In the outdoor heat exchanger (22), the refrigerant releases heat to outdoor air to condense. The refrigerant having condensed in the outdoor heat exchanger (22) passes through the outdoor expansion valve (24) set to a fully open position, flows through the liquid pipe (13), and is then diverted into both the BS units (30A, 30B).

In each of the first and second BS units (30A, 30B), part of the refrigerant flowing through the liquid pipe (13) flows into the supercooling pipe (62), and the rest passes through the supercooling heat exchanger (61) and then flows into the first or second indoor unit (40A, 40B).

In the course of the above flow of refrigerant, the liquid refrigerant having flowed into the supercooling pipe (62) is reduced in pressure by the supercooling control valve (63), and then passes through the supercooling heat exchanger (61). In the supercooling heat exchanger (61), the liquid refrigerant flowing through the supercooling pipe (62) exchanges heat with the liquid refrigerant flowing through the liquid pipe (13) to evaporate. The refrigerant having evaporated flows into the low-pressure gas pipe (12) and then returns to the compressor (21).

The refrigerant having passed through each BS unit (30A, 30B) flows into the associated indoor unit (40A, 40B). For example, in the first indoor unit (40A), the refrigerant is reduced to a low pressure during passage through the indoor expansion valve (42), and then flows through the indoor heat exchanger (41). In the indoor heat exchanger (41), the refrigerant takes heat from room air to evaporate. As a result, the room associated with the first indoor unit (40A) is cooled. In the second indoor unit (40B), the refrigerant flows like the first indoor unit (40A), whereby the associated room is cooled.

The refrigerant having flowed out of each indoor unit (40A, 40B) flows through the low-pressure gas pipe (12) of the associated BS unit (30A, 30B), flows into the outdoor unit (20), and is then sucked into and compressed again by the compressor (21).

<Simultaneous Heating and Cooling Operation>

The simultaneous heating and cooling operation is an operation in which one or some of the indoor units heat their respective rooms and the other cool their respective rooms. In the simultaneous heating and cooling operation, the outdoor heat exchanger (22) serves as an evaporator or a condenser according to the operating conditions. In the indoor units (40A, 40B), the indoor heat exchangers in the rooms requiring heating serve as condensers, whereas the indoor heat exchangers in the rooms requiring cooling serve as evaporators.

<First Simultaneous Mode>

Figure 4:
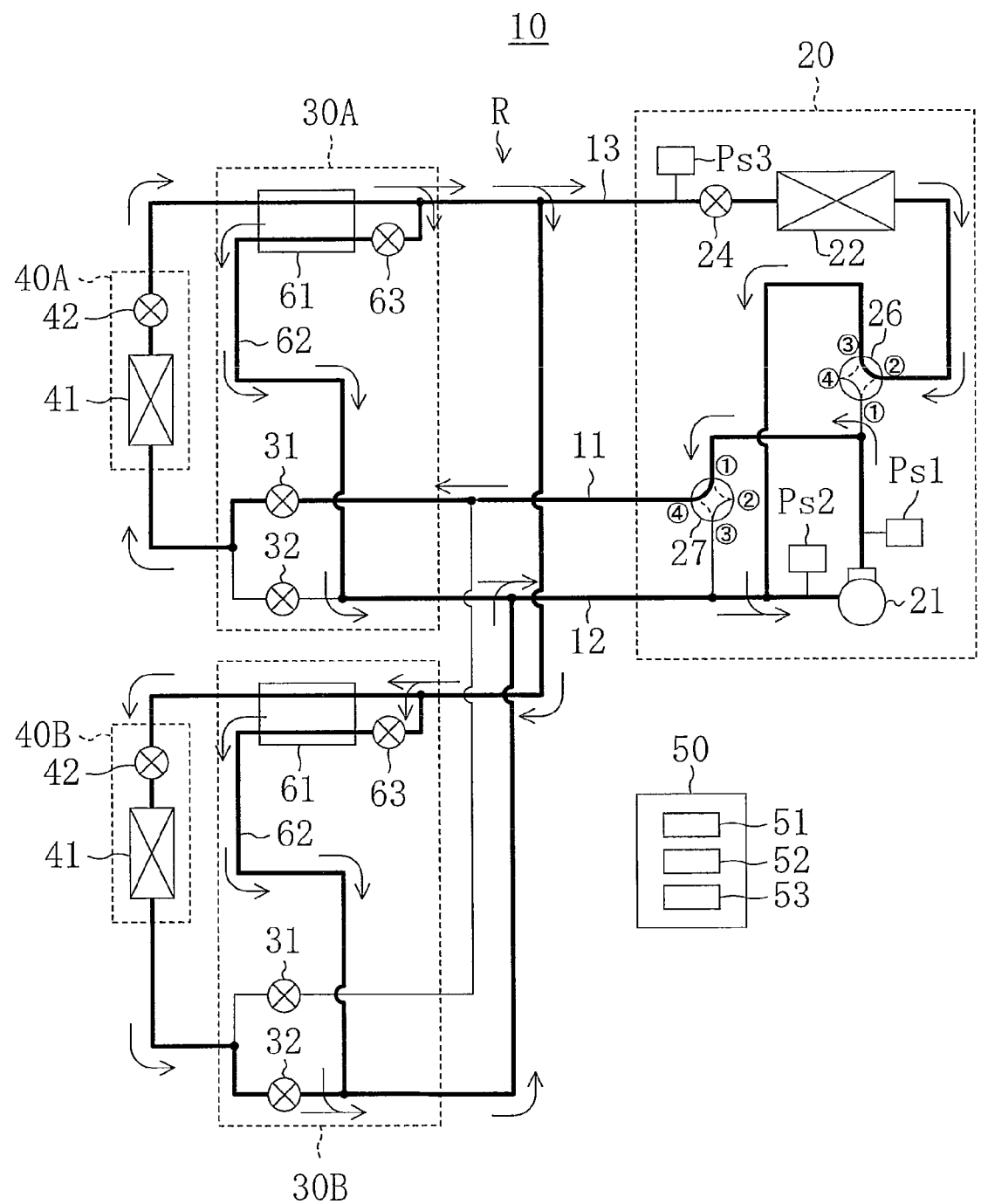
FIG. 4 is a refrigerant circuit diagram for illustrating the flow of refrigerant in a first simultaneous mode of a simultaneous heating and cooling operation.

The first simultaneous mode is an operation in which the first indoor unit (40A) heats the associated room and the second indoor unit (40B) cools the associated room. As shown in FIG. 4, in this operation, each of the first and second four-way selector valves (26, 27) of the outdoor unit (20) is set to a position in which the first and fourth ports are communicated with each other and the second and third ports are communicated with each other. In the first BS unit (30A), the first control valve (31) is opened, and the second control valve (32) is closed. In the second BS unit (30B), the first control valve (31) is closed, and the second control valve (32) is opened.

In this operation, the air conditioner (10) operates in a refrigeration cycle in which the indoor heat exchanger (41) of the first indoor unit (40A) serves as a condenser, whereas the outdoor heat exchanger (22) and the indoor heat exchanger (41) of the second indoor unit (40B) serve as evaporators. More specifically, the refrigerant discharged from the compressor (21) passes through the second four-way selector valve (27), and then flows into the first BS unit (30A). The refrigerant having flowed out of the first BS unit (30A) flows through the indoor heat exchanger (41) of the first indoor unit (40A). In the indoor heat exchanger (41), the refrigerant releases heat to room air to condense. As a result, the room associated with the first indoor unit (40A) is heated. The refrigerant used in the first indoor unit (40A) in order to heat the room flows out to the liquid pipe (13).

The refrigerant flowing through the liquid pipe (13) flows into the first BS unit (30A). In the first BS unit (30A), part of the refrigerant flowing through the liquid pipe (13) flows into the supercooling pipe (62). In the course of the above flow of refrigerant, the liquid refrigerant having flowed into the supercooling pipe (62) is reduced in pressure by the supercooling control valve (63), and then passes through the supercooling heat exchanger (61). In the supercooling heat exchanger (61), the liquid refrigerant flowing through the supercooling pipe (62) exchanges heat with the liquid refrigerant flowing through the liquid pipe (13) to evaporate. The refrigerant having evaporated flows into the low-pressure gas pipe (12) and then returns to the compressor (21).

The liquid refrigerant having passed through the supercooling heat exchanger (61) is diverted into the outdoor unit (20) and the second indoor unit (40B). When passing through the second BS unit (30B), the refrigerant is supercooled by the supercooling heat exchanger (61). Then, the refrigerant is reduced to a low pressure during passage through the indoor expansion valve (42) of the second indoor unit (40B), and then flows through the indoor heat exchanger (41). In the indoor heat exchanger (41), the refrigerant takes heat from room air to evaporate. As a result, the room associated with the second indoor unit (40B) is cooled. The refrigerant used in the second indoor unit (40B) in order to cool the room passes through the second BS unit (30B), and is then sucked into and compressed again by the compressor (21).

On the other hand, the refrigerant having flowed into the outdoor unit (20) is reduced to a low pressure during passage through the outdoor expansion valve (24), and then flows through the outdoor heat exchanger (22). In the outdoor heat exchanger (22), the refrigerant takes heat from outdoor air to evaporate. The refrigerant having evaporated in the outdoor heat exchanger (22) passes through the first four-way selector valve (26), and is then sucked into and compressed again by the compressor (21).

<Second Simultaneous Mode>

Figure 5:
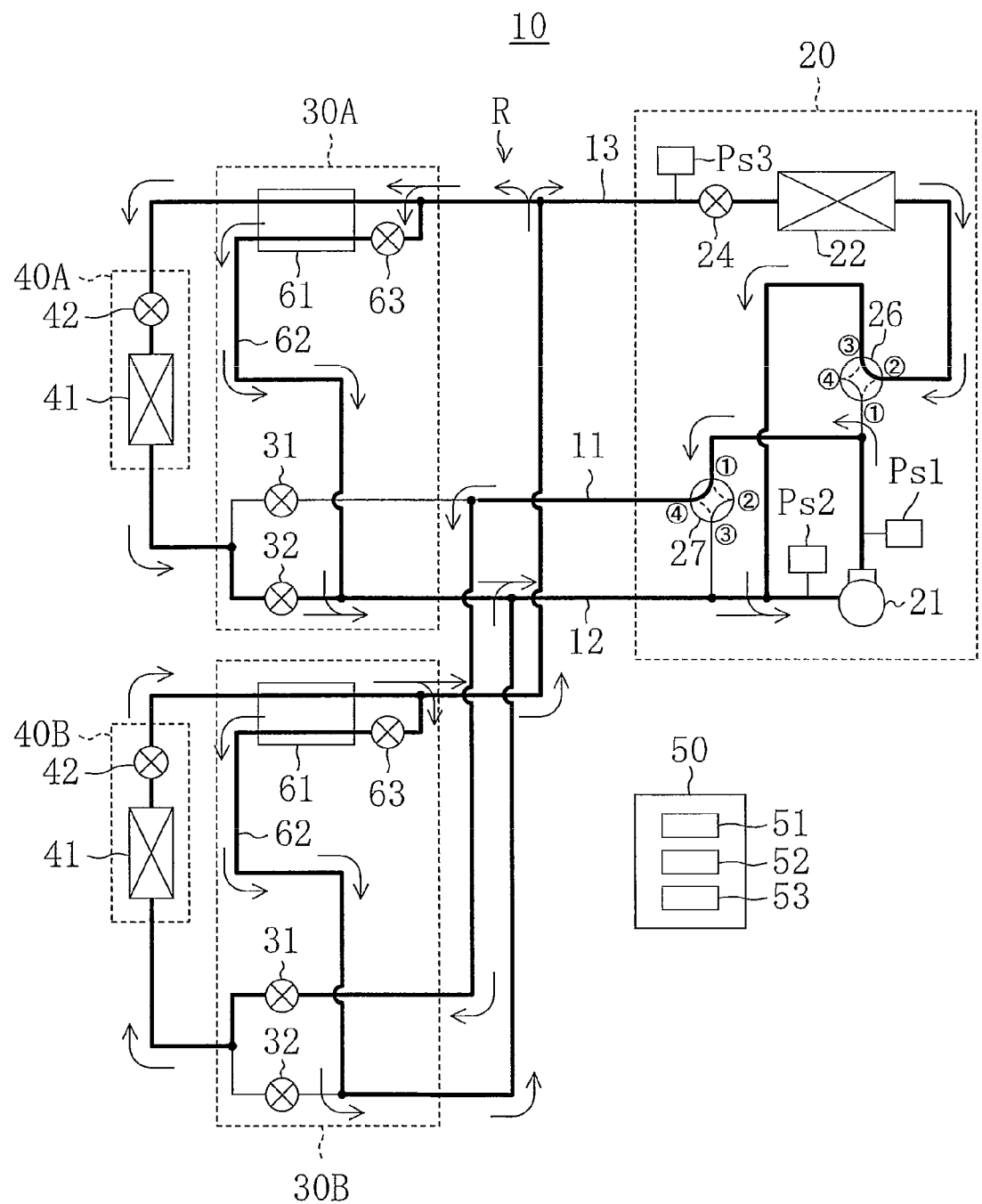
FIG. 5 is a refrigerant circuit diagram for illustrating the flow of refrigerant in a second simultaneous mode of the simultaneous heating and cooling operation.

The second simultaneous mode is an operation in which the first indoor unit (40A) cools the associated room and the second indoor unit (40B) heats the associated room. As shown in FIG. 5, in this operation, each of the first and second four-way selector valves (26, 27) is set to a position in which the first and fourth ports are communicated with each other and the second and third ports are communicated with each other. In the first BS unit (30A), the first control valve (31) is closed, and the second control valve (32) is opened. In the second BS unit (30B), the first control valve (31) is opened, and the second control valve (32) is closed.

In this operation, the air conditioner (10) operates in a refrigeration cycle in which the indoor heat exchanger (41) of the second indoor unit (40B) serves as a condenser, whereas the outdoor heat exchanger (22) and the indoor heat exchanger (41) of the first indoor unit (40A) serve as evaporators. More specifically, the refrigerant discharged from the compressor (21) passes through the second four-way selector valve (27), and then flows into the second BS unit (30B). The refrigerant having flowed out of the second BS unit (30B) flows through the indoor heat exchanger (41) of the second indoor unit (40B). In the indoor heat exchanger (41), the refrigerant releases heat to room air to condense. As a result, the room associated with the second indoor unit (40B) is heated. The refrigerant used in the second indoor unit (40B) in order to heat the room flows out to the liquid pipe (13).

The refrigerant flowing through the liquid pipe (13) flows into the second BS unit (30B). In the second BS unit (30B), part of the refrigerant flowing through the liquid pipe (13) flows into the supercooling pipe (62). In the course of the above flow of refrigerant, the liquid refrigerant having flowed into the supercooling pipe (62) is reduced in pressure by the supercooling control valve (63), and then passes through the supercooling heat exchanger (61). In the supercooling heat exchanger (61), the liquid refrigerant flowing through the supercooling pipe (62) exchanges heat with the liquid refrigerant flowing through the liquid pipe (13) to evaporate. The refrigerant having evaporated flows into the low-pressure gas pipe (12) and then returns to the compressor (21).

The liquid refrigerant having passed through the supercooling heat exchanger (61) is diverted into the outdoor unit (20) and the first indoor unit (40A). When passing through the first BS unit (30A), the refrigerant is supercooled by the supercooling heat exchanger (61). Then, the refrigerant is reduced to a low pressure during passage through the indoor expansion valve (42) of the first indoor unit (40A), and then flows through the indoor heat exchanger (41). In the indoor heat exchanger (41), the refrigerant takes heat from room air to evaporate. As a result, the room associated with the first indoor unit (40A) is cooled. The refrigerant used in the first indoor unit (40A) in order to cool the room passes through the first BS unit (30A), and is then sucked into and compressed again by the compressor (21).

On the other hand, the refrigerant having flowed into the outdoor unit (20) is reduced to a low pressure during passage through the outdoor expansion valve (24), and then flows through the outdoor heat exchanger (22). In the outdoor heat exchanger (22), the refrigerant takes heat from outdoor air to evaporate. The refrigerant having evaporated in the outdoor heat exchanger (22) passes through the first four-way selector valve (26), and is then sucked into and compressed again by the compressor (21).

<Oil Recovery Operation>

There will be described below an operation for recovering refrigerating machine oil accumulating in the refrigerant circuit (R) to the compressor (21), which is a feature of the present invention, with reference to the flow chart in FIG. 6. Note that the operation will be described below by way of example with reference to the refrigerant circuit diagram of FIG. 2 in which both the first and second indoor units (40A, 40B) perform heating operations.

Figure 6:
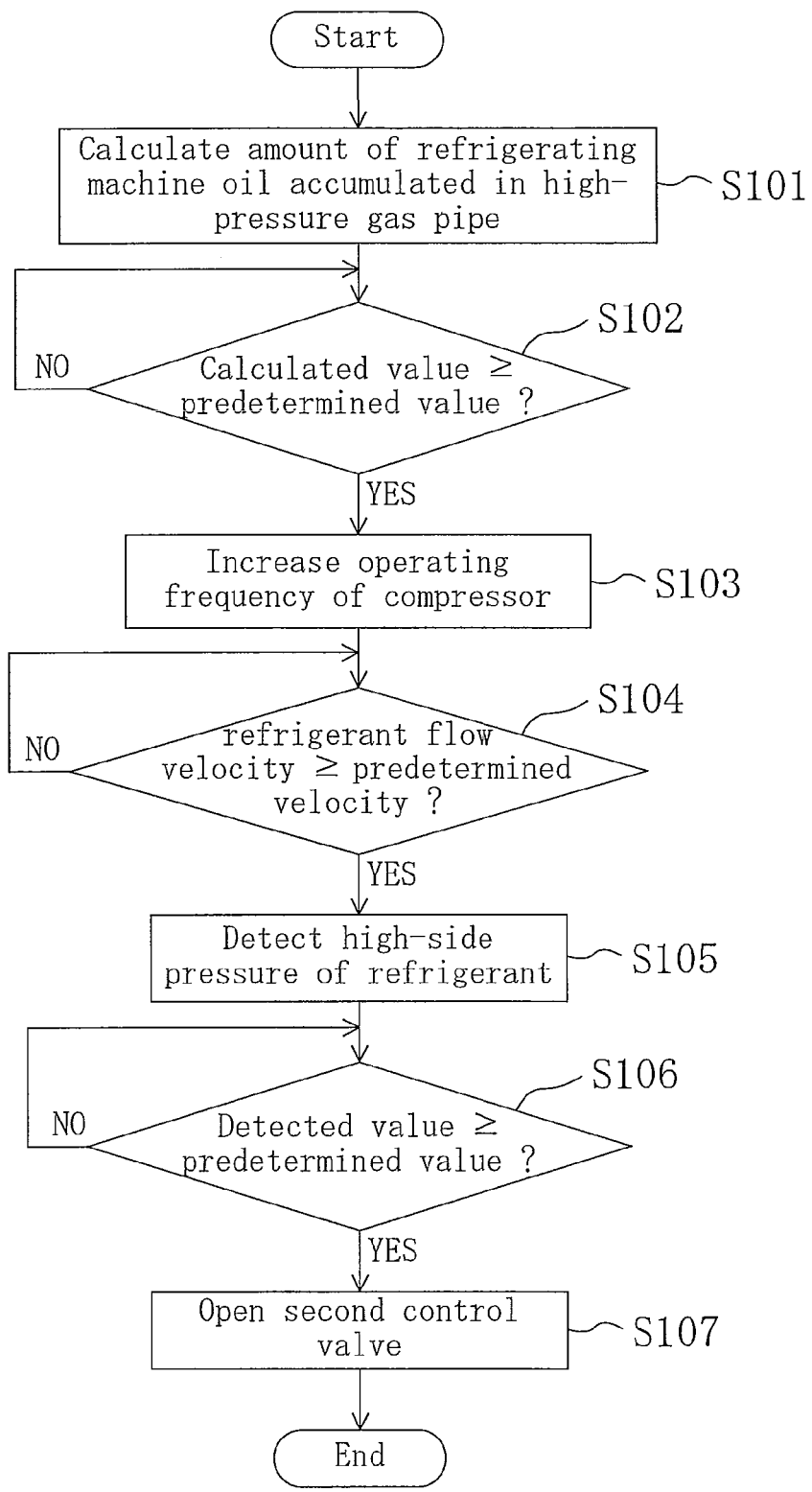
FIG. 6 is a flow chart for illustrating the procedure of recovering refrigerating machine oil accumulating in a high-pressure gas pipe to a compressor.

FIG. 6 is a flow chart for illustrating the procedure of recovering refrigerating machine oil accumulating in the high-pressure gas pipe to the compressor. As shown in FIG. 6, first in Step S101, the oil amount calculation section (51) of the controller (50) calculates the amount of refrigerating machine oil discharged together with high-pressure refrigerant from the compressor (21) and accumulating in the refrigerant circuit (R), and then control proceeds to the next Step S102. Note that, during the heating operation, refrigerating machine oil is likely to accumulate in the high-pressure gas pipes (11) and, therefore, out of refrigerating machine oil in the refrigerant circuit (R), particularly only refrigerating machine oil accumulating in the high-pressure gas pipes (11) will be examined here. More specifically, the operation is carried out according to the following procedure.

First, the mass flow rate of refrigerant discharged from the compressor (21) is calculated based on the capacity of the compressor (21) and the difference between the high-side and low-side pressures detected by the high-side pressure sensor (Ps1) and the low-side pressure sensor (Ps2).

Next, the mass flow rate of refrigerant flowing through the high-pressure gas pipes (11) is calculated. More specifically, the mass flow rate of refrigerant flowing through the high-pressure gas pipes (11) is calculated by subtracting the mass flow rate of liquid refrigerant flowing into the outdoor heat exchanger (22) from the mass flow rate of refrigerant discharged from the compressor (21).

In this relation, the mass flow rate of liquid refrigerant flowing into the outdoor heat exchanger (22) is calculated based such as on the pressure difference between the discharge pressure of the compressor (21) and the value detected by the liquid-side pressure sensor (Ps3) (or the temperature difference equivalent to the pressure difference), the opening of the outdoor expansion valve (24), and the value of coefficient of flow (Cv).

While the mass flow rate of refrigerant is calculated in the above manner, the flow velocity of refrigerant flowing through the high-pressure gas pipes (11) is calculated. More specifically, the flow velocity is calculated based such as on the mass flow rate of refrigerant flowing through the high-pressure gas pipes (11), the cross-sectional area of the pipes, and the refrigerant density calculated from the discharge pressure of high-pressure refrigerant or the saturated temperature equivalent to the discharge pressure.

Furthermore, if the flow velocity of refrigerant flowing through the high-pressure gas pipes (11) is below a predetermined flow velocity where the predetermined flow velocity is the flow velocity of refrigerant at which refrigerating machine oil smoothly circulates through the refrigerant circuit (R) and is recovered to the compressor (21), the refrigerating machine oil is determined to accumulate in the high-pressure gas pipes (11) without being recovered to the compressor (21), and then the amount of refrigerating machine oil accumulating in the high-pressure gas pipes (11) is calculated based on the previously calculated mass flow rate of refrigerant flowing through the high-pressure gas pipes (11). Note that the amount of refrigerating machine oil accumulating in the low-pressure gas pipes (12) will be calculated in the similar manner.

Next, in Step S102, a determination is made of whether or not the value of amount of refrigerating machine oil calculated by the oil amount calculation section (51) is equal to or above a predetermined value, i.e., whether or not the refrigerant circuit (R) has been placed into a state in which the refrigerating machine oil must be recovered because of high probability of the occurrence of poor lubrication in the compressor (21).

If the determination in Step S102 is "YES", control proceeds to Step S103. If the determination in Step S102 is "NO", control waits until the calculated value of amount of refrigerating machine oil is equal to or above the predetermined value.

In Step S103, the frequency control section (52) increases the operating frequency of the compressor (21), and then control proceeds to the next Step S104. In Step S104, a determination is made of whether or not the flow velocity of refrigerant in the refrigerant circuit (R) is equal to or above the predetermined flow velocity, more specifically, the flow velocity at which refrigerating machine oil accumulating in the high-pressure gas pipes (11) of the refrigerant circuit (R) is forcedly circulated through the refrigerant circuit (R) and recovered to the compressor (21).

If the determination in Step S104 is "YES", control proceeds to the next Step S105. The above procedure is preferable because the refrigerating machine oil accumulating in the refrigerant circuit (R) can be recovered without the need to switch to a cooling cycle during the heating operation and, therefore, because the heating capacity can be prevented from being reduced. If the determination in Step S104 is "NO", control waits until the flow velocity of refrigerant is equal to or above the predetermined flow velocity.

In this case, if the forced circulation of refrigerating machine oil accumulating in the high-pressure gas pipes (11) through the control over the capacity of the compressor (21) causes the high-side pressure of refrigerant in the high-pressure gas pipes (11) to become too high, the entire system may be stopped. Therefore, the following control is performed.

In Step S105, during the heating operation and after the control of the frequency control section (52) over the capacity of the compressor (21), the high-side pressure of refrigerant flowing through the refrigerant circuit (R) is detected by the high-side pressure sensor (Ps1), and then control proceeds to the next Step S106.

In Step S106, a determination is made of whether or not the value detected by the high-side pressure sensor (Ps1) is equal to or above a predetermined value. If the determination in Step S106 is "YES", control proceeds to the next Step S107. If the determination in Step S106 is "NO", control waits until the value detected by the high-side pressure sensor (Ps1) is equal to or above the predetermined value.

In Step S107, each of the second control valves (32) of the associated first and second BS units (30A, 30B) is opened to provide communication between the high-pressure gas pipe (11) and the low-pressure gas pipe (12), thereby ending the process.

Thus, each of the first and second BS units (30A, 30B) can provide communication between the high-pressure gas pipe (11) and the low-pressure gas pipe (12) and thereby lead high-pressure gas refrigerant to the compressor (21). This provides an advantageous effect in reducing the increase of pressure in the refrigerant circuit (R) to prevent the entire system from being stopped.

In this embodiment, the amount of refrigerating machine oil accumulating in the high-pressure gas pipes (11) is calculated, and the oil recovery operation is performed when the calculated value of amount of refrigerating machine oil is equal to or above the predetermined value. Alternatively, the operating period of time of the compressor (21) during which the compressor (21) is operating at a predetermined frequency or below may be integrated, and the oil recovery operation may be performed by increasing the operating frequency of the compressor (21) when the integrated value of the operating period of time is equal to or above a predetermined value or above.

The above has been described in relation to the procedure of recovering refrigerating machine oil accumulating in the high-pressure gas pipes (11) because refrigerating machine oil is likely to accumulate in the high-pressure gas pipes (11) during the heating operation. However, it is also conceivable that, for example, refrigerating machine oil contained in refrigerant having passed through the supercooling pipes (62) accumulates in the low-pressure gas pipes (12), or that a low flow velocity of refrigerant during the cooling operation causes refrigerating machine oil to accumulate in the low-pressure gas pipes (12) without being recovered to the compressor (21). The recovery of refrigerating machine oil accumulating in the low-pressure gas pipes (12) is carried out according to the following procedure.

Figure 7:
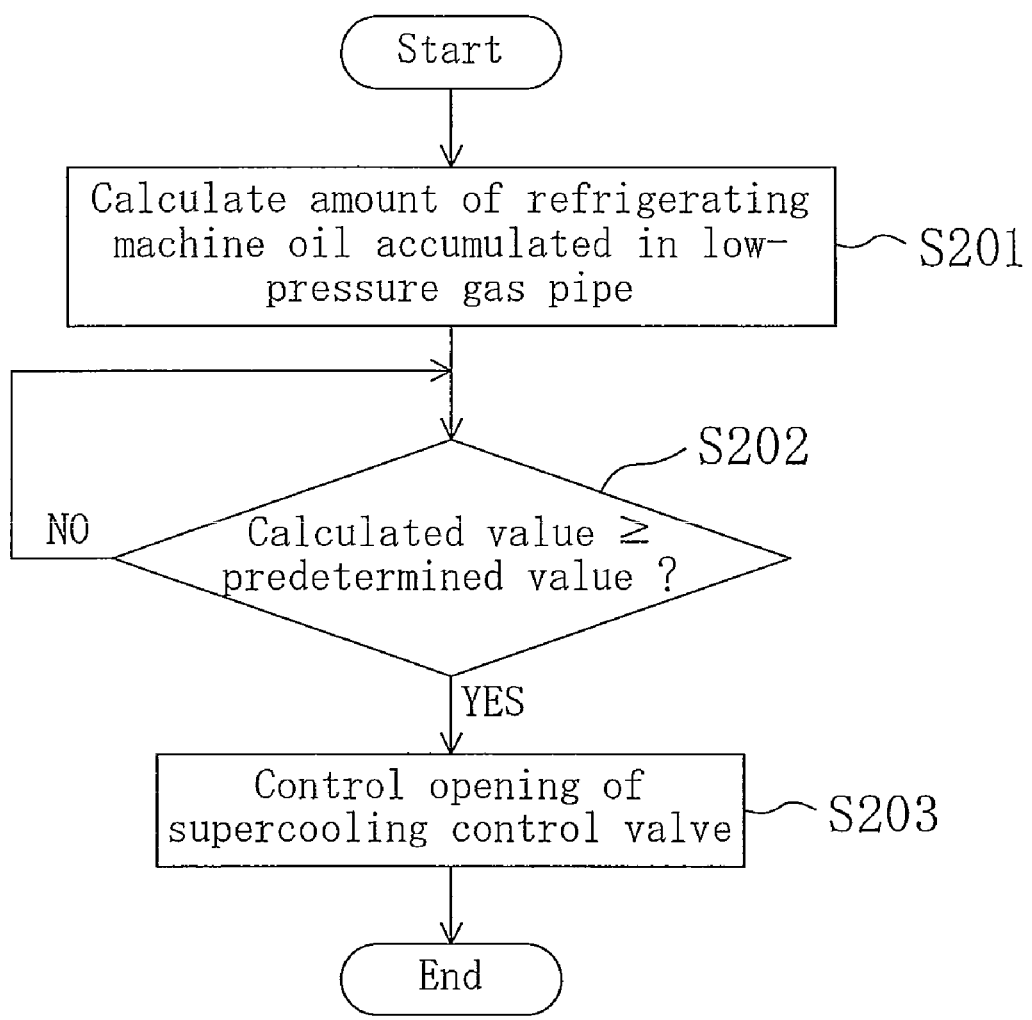
FIG. 7 is a flow chart for illustrating the procedure of recovering refrigerating machine oil accumulating in a low-pressure gas pipe to the compressor.

FIG. 7 is a flow chart for illustrating the procedure of recovering refrigerating machine oil accumulating in the low-pressure gas pipe to the compressor. As shown in FIG. 7, first in Step S201, the oil amount calculation section (51) of the controller (50) calculates the amount of refrigerating machine oil discharged together with high-pressure refrigerant from the compressor (21) and accumulating in the refrigerant circuit (R), and then control proceeds to the next Step S202. Note that, here, the recovery operation is directed only to refrigerating machine oil accumulating in the low-pressure gas pipes (12).

In Step S202, a determination is made of whether or not the value of amount of refrigerating machine oil calculated by the oil amount calculation section (51) is equal to or above a predetermined value, i.e., whether or not the refrigerant circuit (R) has been placed into a state in which the refrigerating machine oil must be recovered because of high probability of the occurrence of poor lubrication in the compressor (21).

If the determination in Step S202 is "YES", control proceeds to Step S203. If the determination in Step S202 is "NO", control waits as it is.

In Step S203, the opening control section (53) controls the openings of the supercooling control valves (63) of the associated first and second BS units (30A, 30B) to allow liquid refrigerant flowing through the liquid pipe (13) to flow through the supercooling pipes (62) into the low-pressure gas pipes (12) in substantially unchanged form, thereby ending the process.

Thus, refrigerating machine oil accumulating in the low-pressure gas pipe (12) such as owing to a low flow velocity of refrigerant during the cooling operation can be blended into liquid refrigerant and recovered to the compressor (21). This is preferable because the refrigerating machine oil accumulating in the low-pressure gas pipes (12) can be recovered without the need to switch to a cooling cycle during the heating operation and, therefore, because the heating capacity can be prevented from being reduced.

<Other Embodiments>

Figure 8:
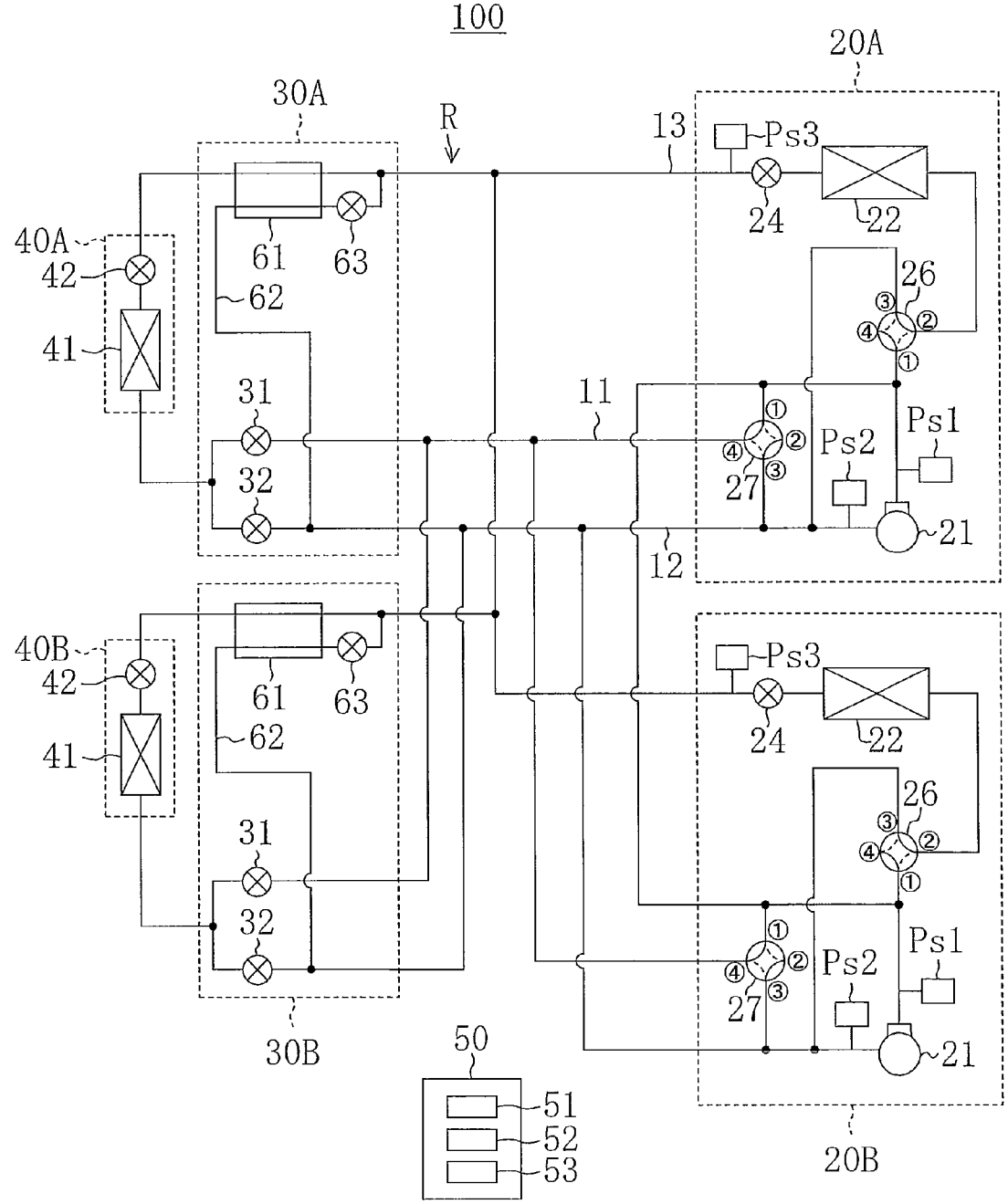
FIG. 8 is a refrigerant circuit diagram showing the configuration of another air conditioner.

The above embodiment may have the following configurations. The number of indoor units and the number of outdoor units as described in the above embodiment are merely illustrative. For example, as in an air conditioner (100) shown in FIG. 8, the air conditioner may have a configuration in which two indoor units (40A, 40B) and two outdoor units (20A, 20B) are connected. Alternatively, the air conditioner may have a configuration in which the number of indoor units and the number of outdoor units are further increased.

Industrial Applicability

As can be seen from the above description, the present invention provides a highly practical effect of being able to recover refrigerating machine oil accumulating in the refrigerant circuit without impairing the heating capacity of the air conditioner. Therefore, the present invention is very useful and has a high industrial applicability.

The invention claimed is:

1. An air conditioner including a refrigerant circuit in which a compressor, a heat-source side heat exchanger and a utilization side heat exchanger are connected, the refrigerant circuit being operable in a refrigeration cycle by circulating refrigerant therethrough, the air conditioner comprising:

an oil amount calculation device configured to calculate the amount of refrigerating machine oil discharged together with high-pressure refrigerant from the compressor and accumulating in the refrigerant circuit; and a frequency control device configured to increase the operating frequency of the compressor to recover the refrigerating machine oil in the refrigerant circuit when during a heating operation the value calculated by the oil amount calculation device is equal to or above a predetermined value.

2. The air conditioner of claim 1, further comprising a pressure detection device configured to detect the high-side pressure of refrigerant flowing through the refrigerant circuit, wherein the utilization side heat exchanger is connected at one end to a liquid pipe in the refrigerant circuit, and connected at the other end through a switching mechanism to a high-pressure gas pipe and a low-pressure gas pipe in the refrigerant circuit to be switchable between both the gas pipes, and the switching mechanism includes a first control valve for selectively permitting or shutting off the flow of refrigerant into the high-pressure gas pipe, and a second control valve for selectively permitting or shutting off the flow of refrigerant into the low-pressure gas pipe, and is configured to provide communication between the high-pressure gas pipe and the low-pressure gas pipe by opening the second control valve when the value detected by the pressure detection device is equal to or above a predetermined value after the frequency control device increases the operating frequency of the compressor during the heating operation.

3. The air conditioner of claim 2, further comprising:

a supercooling heat exchanger forsupercooling liquid refrigerant flowing through the liquid pipe;

a supercooling pipe connected at one end to the liquid pipe, passing through the supercooling heat exchanger and connected at the other end to the low-pressure gas pipe;

a supercooling control valve disposed in the supercooling pipe between the one end of the supercooling pipe and the supercooling heat exchanger and being adjustable in opening; and an opening control device configured to control the opening of the supercooling control valve to allow liquid refrigerant to flow into the low-pressure gas pipe when the value calculated by the oil amount calculation device is equal to or above the predetermined value.

4. The air conditioner of claim 1, wherein the oil amount calculation device is configured to calculate the amount of refrigerating machine oil accumulating in the refrigerant circuit based on the amount of high-pressure refrigerant discharged from the compressor when the flow velocity of refrigerant in the refrigerant circuit is below a predetermined flow velocity.

5. An air conditioner including a refrigerant circuit in which a compressor, a heat-source side heat exchanger and a utilization side heat exchanger are connected, the refrigerant circuit being operable in a refrigeration cycle by circulating refrigerant therethrough, the air conditioner comprising:
a frequency control device configured to integrate the operating period of time of the compressor during which the air conditioner is in a heating operation and the compressor is operating at a predetermined frequency or below, and increase the operating frequency of the compressor when the integrated value of the operating period of time is equal to or above a predetermined value; and
a pressure detection device configured to detect the high-side pressure of refrigerant flowing through the refrigerant circuit,
wherein the utilization side heat exchanger is connected at one end to a liquid pipe in the refrigerant circuit, and connected at the other end through a switching mechanism to a high-pressure gas pipe and a low-pressure gas pipe in the refrigerant circuit to be switchable between both the gas pipes, and
the switching mechanism includes a first control valve for selectively permitting or shutting off the flow of refrigerant into the high-pressure gas pipe, and a second control valve for selectively permitting or shutting off the flow of refrigerant into the low-pressure gas pipe, and is configured to provide communication between the high-pressure gas pipe and the low-pressure gas pipe by opening the second control valve when the value detected by the pressure detection device is equal to or above a predetermined value after the frequency control means increases the operating frequency of the compressor during the heating operation.

6. The air conditioner of claim 5, wherein the frequency control device is configured to return the increased operating frequency of the compressor to an operating frequency in a normal operation when a predetermined period of time has passed since the increase of the operating frequency.

7. The air conditioner of claim 5, further comprising:
a supercooling heat exchanger for supercooling liquid refrigerant flowing through the liquid pipe;
a supercooling pipe connected at one end to the liquid pipe, passing through the supercooling heat exchanger and connected at the other end to the low-pressure gas pipe;
a supercooling control valve disposed in the supercooling pipe between the one end of the supercooling pipe and the supercooling heat exchanger and being adjustable in opening; and
an opening control device configured to control the opening of the supercooling control valve to allow liquid refrigerant to flow into the low-pressure gas pipe when the integrated value of the operating period of time of the compressor during which the compressor is operating at the predetermined frequency or below is equal to or above the predetermined value.

* * * * *